United States Patent
Chastain et al.

(10) Patent No.: US 12,026,539 B2
(45) Date of Patent: *Jul. 2, 2024

(54) SERVICE CREATION AND MANAGEMENT

(71) Applicant: Atlassian US, Inc., San Francisco, CA (US)

(72) Inventors: Walter Cooper Chastain, Atlanta, GA (US); Frank Cariello, Red Bank, NJ (US); Reuben Klein, East Brunswick, NJ (US); Paul Edward Smith, Rockwall, TX (US)

(73) Assignee: ATLASSIAN US, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/111,583

(22) Filed: Feb. 19, 2023

(65) Prior Publication Data

US 2023/0205567 A1    Jun. 29, 2023

Related U.S. Application Data

(60) Continuation of application No. 17/338,780, filed on Jun. 4, 2021, now Pat. No. 11,586,461, which is a
(Continued)

(51) Int. Cl.
*G06F 9/455* (2018.01)
*G06F 9/50* (2006.01)

(52) U.S. Cl.
CPC ...... *G06F 9/45558* (2013.01); *G06F 9/45533* (2013.01); *G06F 9/45537* (2013.01);
(Continued)

(58) Field of Classification Search
CPC ............ G06F 9/45558; G06F 9/45533; G06F 9/45537; G06F 9/50; G06F 9/5077;
(Continued)

(56) References Cited

U.S. PATENT DOCUMENTS 8,010,936 B2   8/2011  Brown et al.
8,239,536 B2   8/2012  Wang
(Continued)

FOREIGN PATENT DOCUMENTS

CN    103338163    10/2013
CN    103595647    2/2014
(Continued)

OTHER PUBLICATIONS

Open Networking Foundation, "OpenFlow-enabled SDN and Network Functions Virtualization," ONF Solution Brief, Feb. 17, 2014, Open Networking Foundation.
(Continued)

*Primary Examiner* — Gregory A Kessler
(74) *Attorney, Agent, or Firm* — Brownstein Hyatt Farber Schreck, LLP

(57) ABSTRACT

Concepts and technologies are disclosed herein for service creation and management. A processor can detect an event relating to a service, and access a service creation database to identify a recipe associated with the service. The recipe can define a resource to be used to provide the service. The processor can access an inventory to determine if the resource is available, identify a service control to control the service, instruct an infrastructure control to allocate virtual machines to host components of the service, and issue instructions to the service control. The instructions can instruct the service control to load service functions to the virtual machines.

20 Claims, 6 Drawing Sheets

Related U.S. Application Data division of application No. 16/734,536, filed on Jan. 6, 2020, now Pat. No. 11,029,994, which is a continuation of application No. 16/104,914, filed on Aug. 19, 2018, now Pat. No. 10,528,381, which is a continuation of application No. 14/493,781, filed on Sep. 23, 2014, now Pat. No. 10,055,240.

(52) U.S. Cl.
CPC ...... *G06F 9/50* (2013.01); *G06F 2009/45562* (2013.01); *G06F 2009/4557* (2013.01); *G06F 2009/45595* (2013.01); *G06F 9/5077* (2013.01)

(58) Field of Classification Search
CPC ... G06F 2009/45562; G06F 2009/4557; G06F 2009/45595
See application file for complete search history.

(56) References Cited

U.S. PATENT DOCUMENTS

| | | |
|---|---|---|
| 8,584,121 B2 | 11/2013 | Arcese et al. |
| 8,769,105 B2 | 7/2014 | Lacapra |
| 8,972,519 B2 | 3/2015 | Attanasio et al. |
| 9,052,932 B2 | 6/2015 | Anand et al. |
| 9,218,190 B2 | 12/2015 | Anand et al. |
| 9,262,730 B2 | 2/2016 | Um et al. |
| 2006/0242641 A1 | 10/2006 | Kinsey et al. |
| 2008/0243993 A1 | 10/2008 | Wang |
| 2008/0313597 A1 | 12/2008 | Brown et al. |
| 2010/0299419 A1 | 11/2010 | Ramankutty et al. |
| 2010/0306377 A1 | 12/2010 | DeHaan et al. |
| 2011/0173251 A1 | 7/2011 | Sandhu et al. |
| 2012/0089980 A1 | 4/2012 | Sharp et al. |
| 2012/0131180 A1 | 5/2012 | Nomura et al. |
| 2012/0246319 A1 | 9/2012 | Um et al. |
| 2012/0246638 A1 | 9/2012 | He et al. |
| 2012/0266170 A1 | 10/2012 | Zimmerman et al. |
| 2013/0227699 A1 | 8/2013 | Barak et al. |
| 2013/0250770 A1 | 9/2013 | Zou et al. |
| 2013/0266007 A1 | 10/2013 | Kumbhare et al. |
| 2013/0283374 A1 | 10/2013 | Zisapel et al. |
| 2013/0311675 A1 | 11/2013 | Kancherla |
| 2013/0318243 A1 | 11/2013 | Chinthalapati et al. |
| 2013/0322443 A1 | 12/2013 | Dunbar et al. |
| 2013/0329601 A1 | 12/2013 | Yin et al. |
| 2014/0003422 A1 | 1/2014 | Mogul et al. |
| 2014/0029451 A1 | 1/2014 | Nguyen |
| 2014/0050223 A1 | 2/2014 | Foo et al. |
| 2014/0052877 A1 | 2/2014 | Mao |
| 2014/0075035 A1 | 3/2014 | Revanuru et al. |
| 2014/0075557 A1 | 3/2014 | Balabine et al. |
| 2014/0089500 A1 | 3/2014 | Sankar et al. |
| 2014/0098673 A1 | 4/2014 | Lee et al. |
| 2014/0112190 A1 | 4/2014 | Chou et al. |
| 2014/0123135 A1 | 5/2014 | Huang |
| 2014/0133456 A1 | 5/2014 | Donepudi et al. |
| 2014/0137112 A1 | 5/2014 | Rigolet et al. |
| 2014/0149980 A1 | 5/2014 | Vittal et al. |
| 2014/0153572 A1 | 6/2014 | Hampel et al. |
| 2014/0173594 A1 | 6/2014 | Ng et al. |
| 2014/0173595 A1 | 6/2014 | Anand et al. |
| 2014/0173597 A1 | 6/2014 | Anand et al. |
| 2014/0192645 A1 | 7/2014 | Zhang et al. |
| 2014/0211661 A1 | 7/2014 | Gorkemli et al. |
| 2014/0282525 A1 | 9/2014 | Sapuram et al. |
| 2014/0330948 A1 | 11/2014 | Dunn et al. |
| 2014/0337435 A1 | 11/2014 | Kaefer et al. |
| 2015/0074670 A1 | 3/2015 | Gerganov et al. |
| 2015/0113149 A1 | 4/2015 | Gan et al. |
| 2015/0212857 A1 | 7/2015 | Beveridge et al. |
| 2015/0220358 A1 | 8/2015 | Ponsford et al. |
| 2015/0301850 A1 | 10/2015 | Jeong et al. |
| 2015/0339146 A1 | 11/2015 | Ponsford et al. |
| 2015/0381515 A1 | 12/2015 | Mattson et al. |

FOREIGN PATENT DOCUMENTS

| | | |
|---|---|---|
| CN | 103746892 | 4/2014 |
| EP | 2053787 | 8/2011 |

OTHER PUBLICATIONS

Travostino et al., "Grid Networks Enabling Grids with Advanced Communication Technology," 2006, John Wiley & Sons Ltd, England.
Zahedi, Saed, "Virtualization Security Threat Forensic and Environment Safeguarding," Degree project, Jan. 31, 2014, Linn☐us University, Sweden.
Gu Eye et al., "Proposal for a Cloud Computing Solution and Application in a Pedagogical Virtual Organization," Joint International Conference on Engineering Education & International Conference on Information Technology, Jun. 2-6, 2014, ICEE/ICIT.
Letaifa et al., "State of the Art and Research Challenges of New Services Architecture Technologies: Virtualization, SOA and Cloud Computing," International Journal of Grid and Distributed Computing, Dec. 2010, vol. 3, No. 4, pp. 69-88.
Zissis et al., "Securing e-Government and e-Voting With an Open Cloud Computing Architecture," Government Information Quarterly, Mar. 12, 2011, 28.2, pp. 239-251.
Buyya, Rajkumar et al., "Market-Oriented Cloud Computing—Vision, Hype, and Reality for Delivering IT Services as Computing Utilities," 2008, pp. 5-13.
Poladian, Vahe et al., "Dynamic Configuration of Resource-Aware Services," 2004, pp. 1-10.
Greenberg, Albert et al., "The Cost of a Cloud—Research Problems in Data Center Networks," 2009, pp. 68-73.
Czajkowski, Karl et al., "Grid Information Services for Distributed Resource Sharing," 2001, pp. 181-194.
May, Nicholas, "Dynamic Service Quality and Resource Negotiation for High-Availability Service-Oriented Systems," 2010, pp. 327-328.
Kumari, Anitha K. et al., "Trigon Based Authentication Service Creation with Globus Middleware," 2011, pp. 1-6.

SERVICE CREATION AND MANAGEMENT

CROSS-REFERENCE TO RELATED APPLICATION(S)

This application is a continuation patent application of U.S. patent application Ser. No. 17/338,780, filed Jun. 4, 2021 and titled "Service Creation and Management," which is a divisional patent application of U.S. patent application Ser. No. 16/734,536, filed Jan. 6, 2020 and titled "Service Creation and Management," now U.S. Pat. No. 11,029,994, which is a continuation patent application of U.S. patent application Ser. No. 16/104,914, filed Aug. 19, 2018 and titled "Service Creation and Management," now U.S. Pat. No. 10,528,381, which is a continuation patent application of U.S. patent application Ser. No. 14/493,781, filed Sep. 23, 2014 and titled "Service Creation and Management," now U.S. Pat. No. 10,055,240, the disclosures of which are hereby incorporated herein by reference in their entireties.

BACKGROUND

In the past few years, service creation, maintenance, and delivery have evolved. Some services may rely upon new technologies such as virtualization, for example the European Telecommunications Standards Institute ("ETSI") network functions virtualization ("NFV"), other "cloud" computing architecture, software defined networking ("SDN"), or the like. Various approaches for creating and deploying applications in these evolved networks on dedicated server infrastructure are generally understood, but a virtualized infrastructure has properties such as scalability and active reassignment of idle capacity that may not be well understood or explored. Applications that are not structured to make use of scalability and/or active reassignment of idle capacity may be more costly and less efficient than an identical or similar application that runs on dedicated infrastructure.

Building services that are designed around a dedicated infrastructure concept and deploying them in a virtualized infrastructure may not exploit the capabilities of, or provide financial benefit from, the virtualized network. Similarly, building a virtualized service that does not provide flexible routing of messages between service components may significantly increase the complexity of the virtualized service relative to an application on dedicated infrastructure.

SUMMARY

The present disclosure is directed to service creation and management. The concepts and technologies described herein can provide an architectural framework for a user defined network cloud ("UDNC") that can include virtualization and software defined networking ("SDN"). The framework can use a reference model that defines how orchestration, virtualization, and software defined networking are used together to create, manage, and provide services to users. The framework can support scaling of the components used to deliver a service based upon a present or anticipated traffic load generated by the user. Scaling and/or relocation of service components also are supported.

The framework is configured to engage the hardware infrastructure components needed to deliver a level of service associated with a current load, and as such, the framework does not require the engagement of additional hardware resources that may not be needed to provide the service. The framework can take into account incidental resources that may be required to accommodate unexpected eventualities, such as hardware malfunctions, spikes in traffic, network congestion, combinations thereof, or the like.

The framework allows separation of services, service components, and networking transport functions from the underlying network and infrastructure. This separation, along with virtualization and software defined networking, can be used to enable independent management of service logic, network routing, and physical infrastructure; service creation that may not be limited by fixed underlying network or computing infrastructure; efficient use and/or re-use of modular service logic in multiple service contexts; configuration of network connectivity using SDN; instantiation and scaling of components based on real-time usage; and service and network programmability. In some instances, the framework is created by integrating the UDNC reference model with an enhanced control, orchestration, management, and policy frameworks ("ECOMP") Framework.

In some embodiments of the concepts and technologies described herein, a control system can include an operations management controller, a service creation database, an inventory, an infrastructure control, a network control, and a service control. The control system can interact with network infrastructure, one or more business support systems ("BSS"), and/or one or more operations support systems ("OSS"); and/or can integrate an ECOMP framework. The operations management controller can detect an impending capacity change, a request to configure or change configuration of a service, or a request for a new service. The operations management controller can analyze one or more policies to determine how the scaling or creation of the service should be handled or accomplished. The operations management controller also can access the service creation database to identify one or more "recipes" that can be used to scale or create the service. The recipes can define service components including hardware, software, and/or transport.

The operations management controller can access the inventory to determine if the resources needed to support the new or scaled service are available for use. The operations management controller also can identify a service control that is to handle the scaled or created service. A scaled service may be controlled by a service control that already is controlling the service. The operations management controller can select, allocate, and/or create the service control. The operations management controller also can instruct the infrastructure control to instantiate one or more virtual machines ("VMs") and to load and validate one or more virtual service functions ("VSFs") and/or virtual network functions ("VNFs") to the VMs. It should be understood that if the service is being scaled down, the infrastructure control may de-allocate VMs and/or VSFs instead of instantiating the VMs and/or VSFs. The infrastructure control can also instruct the network control to create or establish transport between the VMs, the VSFs, and/or the service control. In the case of scaled down services, it can be appreciated that the network control may de-allocate or tear down transport. The network control can report the event to a network data collection, analysis, and event handling ("DCAE") process, and/or update a network inventory or a global inventory.

The service control can receive instructions from the operations management controller to instantiate or tear down one or more VSFs. The service control can report the event to a service DCAE and update the service inventory (and/or the inventory). The network control also can receive instructions to establish transport between the new VSFs and report the event to the network DCAE for scaled up services and/or to tear down the VSFs and report those events to the network DCAE for scaled down services. The network control can establish transport using VNFs and/or physical network functions ("PNFs"). The operations management controller can validate the scaled or created service end-to-end and/or update the inventory. Embodiments for scaling the service at the service control also are disclosed. The embodiments for scaling the service at the service control can be substantially similar in functionality, though the operations can occur at different elements of the control system.

According to one aspect of the concepts and technologies disclosed herein, a method is disclosed. The method can include detecting, at a computing system including a processor, an event relating to a service. The processor can access a service creation database to identify a recipe associated with the service. The recipe can define a resource to be used to provide the service. The method also can include accessing, by the processor, an inventory to determine if the resource is available and identifying, by the processor, a service control to control the service. The method also can include instructing, by the processor, an infrastructure control to allocate virtual machines to host components of the service, and issuing, by the processor, instructions to the service control. The instructions can instruct the service control to load service functions to the virtual machines.

In some embodiments, the event relating to the service can include a capacity change associated with the service. In some embodiments, the event relating to the service can include a request to create the service. In some embodiments, the infrastructure control can allocate a virtual machine, load an image with an embedded virtual service function to the virtual machine, and validate the image loaded to the virtual machine. The infrastructure control also can load an image with an embedded virtual network function to the virtual machine, and validate the image loaded to the virtual machine. The infrastructure control can report the event to an infrastructure data collection analysis and event handler process. The infrastructure control also can update an infrastructure inventory to reflect allocation of the virtual machine.

In some embodiments, the infrastructure control can instruct a network control to create network transport to support the service. In some embodiments, the computing system can execute an operations management controller, and the computing system can expose an operations management application programming interface to support interactions with the infrastructure control and the service control. In some embodiments, the event can include a request to create a new service. The request can be received from one of a business support system and an operations support system. In some embodiments, identifying the service control can include determining that the service control does not exist and creating the service control.

According to another aspect of the concepts and technologies disclosed herein, a computer storage medium is disclosed. The computer storage medium can have computer-executable instructions stored thereon that, when executed by a processor, cause the processor to perform operations. The operations can include detecting an event relating to a service, accessing a service creation database to identify a recipe associated with the service, the recipe defining a resource to be used to provide the service, accessing an inventory to determine if the resource is available, identifying a service control to control the service, instructing an infrastructure control to allocate virtual machines to host components of the service, and issuing instructions to the service control. In some embodiments, the instructions can instruct the service control to load service functions to the virtual machines.

In some embodiments, the infrastructure control allocates a virtual machine, loads an image with an embedded virtual service function to the virtual machine, and validates the image loaded to the virtual machine. The infrastructure control also can load an image with an embedded virtual network function to the virtual machine, and validate the image loaded to the virtual machine. The infrastructure control can report the event to an infrastructure data collection analysis and event handler process, and can update an infrastructure inventory to reflect allocation of the virtual machine. In some embodiments, the infrastructure control can instruct a network control to create network transport to support the service. In some embodiments, identifying the service control can include determining that the service control does not exist, and creating the service control.

According to yet another aspect, another method is disclosed. The method can include detecting, at a computing system including a processor, an event relating to a service; accessing, by the processor, a policy and a graph to determine a responsive action to the event. The responsive action can define a resource to be used to provide the service. The method also can include accessing, by the processor, an inventory to determine if the resource is available; instructing, by the processor, an infrastructure control to modify virtual machines that host components of the service; and modifying, by the processor, virtual service functions on the virtual machines.

In some embodiments, the event relating to the service can include a capacity change associated with the service. Modifying the virtual service functions can include creating the virtual service functions. In some embodiments, the event relating to the service can include a capacity change associated with the service. Modifying the virtual service functions can include de-allocating the virtual service functions. In some embodiments, modifying the virtual service functions can include changing the configurations of the virtual service functions. In some embodiments, the method can include updating the inventory to reflect the modifying. In some embodiments, the event can include a message received at the processor, the message being received from the service. In some embodiments, the method can include instructing a network control to modify network transport that supports the service.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
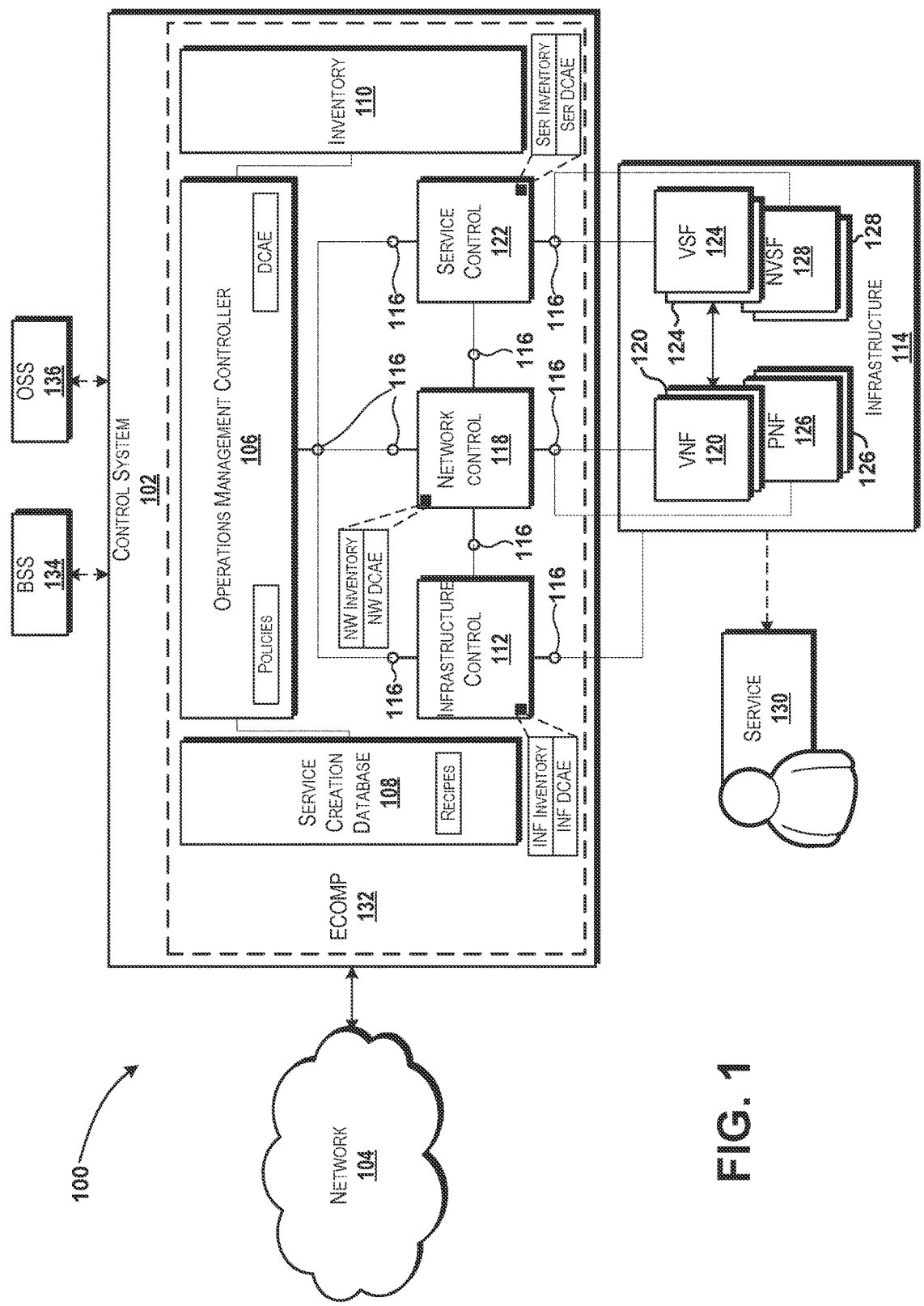
FIG. 1 is a system diagram illustrating an illustrative operating environment for various embodiments of the concepts and technologies described herein.

The following detailed description is directed to service creation and management. A control system can include an operations management controller, a service creation database, an inventory, an infrastructure control, a network control, and a service control. The control system can interact with network infrastructure, one or more business support systems ("BSS"), one or more operations support systems ("OSS"), and/or one or more virtualized functions, and the control system also can integrate an enhanced control, orchestration, management, and policy frameworks ("ECOMP"). The operations management controller can detect an impending capacity change, a request to configure a service, a request to reconfigure a service, a request to terminate a service, a request for a new service, or other requests. In the case of scaling or creating services, the operations management controller can analyze one or more policies to determine how the scaling or creation of the service should be handled or accomplished. The operations management controller also can access the service creation database to identify one or more "recipes" that can be used to scale or create the service. The recipes can define service components including hardware, software, and/or transport.

The operations management controller can access the inventory to determine if the resources needed to support the new or scaled service are available for use. The operations management controller also can identify a service control that is to handle the scaled or created service. In some instances, a scaled service may be controlled by a service control that already is controlling the service, though this is not necessarily the case. The operations management controller can select, allocate, and/or create the service control. The operations management controller also can instruct the infrastructure control to instantiate one or more virtual machines ("VMs") and to load and validate one or more virtual service functions ("VSFs") and/or virtual network functions ("VNFs") to the VMs. The operations management controller also can instruct a network control to load VNFs to the VMs, in some embodiments. It should be understood that if the service is being scaled down, that the infrastructure control may de-allocate VMs and/or VSFs instead of instantiating the VMs and/or VSFs. The infrastructure control can also instruct the network control to create or establish transport between the VMs, the VSFs, and/or the service control. In the case of scaled down services, it can be appreciated that the network control may de-allocate or tear down transport. The network control can report the event to a network data collection, analysis, and event handling ("DCAE") process, and/or update a network inventory or a global inventory.

The service control can receive instructions from the operations management controller to instantiate or tear down one or more VSFs. The service control can report the event to a service DCAE and update the service inventory (and/or the inventory). The network control also can receive instructions to establish transport between the new VSFs and report the event to the network DCAE for scaled up services and/or to tear down the VSFs and report those events to the network DCAE for scaled down services. The network control can establish transport using VNFs and/or PNFs. The operations management controller can validate the scaled or created service end-to-end and/or update the inventory. Embodiments for scaling the service at the service control also are disclosed.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for service creation and management will be described, according to an illustrative embodiment. The operating environment 100 shown in FIG. 1 includes a computing system that can host a network control framework (hereinafter referred to as a "control system") 102. The control system 102 can operate on, in communication with, and/or as a part of a communications network ("network") 104.

According to various embodiments, the functionality of the control system 102 may be provided by one or more server computers, workstations, desktop computers, laptop computers, other computing systems, combinations thereof, or the like. In some embodiments, the functionality of the control system 102 can be provided by a distributed computing system that can host processing and/or storage resources that collectively can be configured to provide the functionality illustrated and described herein. Thus, it should be understood that the functionality of the control system 102 can be provided by a single device, by two similar devices, and/or by two or more dissimilar devices. For purposes of describing the concepts and technologies disclosed herein, the control system 102 is described herein as including a server computer. It should be understood that this embodiment is illustrative, and should not be construed as being limiting in any way.

The device that hosts the control system 102 can execute an operating system (not shown in FIG. 1) and one or more application programs that can provide the functionality of the control system 102 illustrated and described herein. The operating system can include a computer program for controlling the operation of the device, and the application programs can include executable programs configured to execute on top of the operating system to provide various functions as illustrated and described herein. Thus, while the control system 102 is illustrated and described as including multiple elements, it should be understood that the functionality of the elements shown in FIG. 1 can be provided by application modules executed by a single device, in some embodiments. In some other embodiments, the functionality of the elements shown in FIG. 1 can be provided by multiple devices that can host one or more elements of the control system 102. As such, the illustrated and described embodiment should be understood as being illustrative of one contemplated embodiment of the concepts and technologies described herein and should not be construed as being limiting in any way.

As shown in FIG. 1, the control system 102 can include an operations management controller 106. The operations management controller 106 can be configured to provide control and management of the control system 102 and/or the various elements thereof. According to various embodiments, the operations management controller 106 can provide high level and end-to-end control of services, creation of services, and/or management of services. Thus, as will be illustrated and described in more detail with reference to FIGS. 2-4, the operations management controller 106 can manage services across multiple scopes (e.g., through infrastructure, network, and service scopes), and can control and orchestrate service creation and management.

The operations management controller 106 can serve as a master service orchestrator ("MSO") for the control system 102. The operations management controller 106 can instantiate new services based upon "recipes" that can be stored in a service creation database 108. The operations management controller 106 also can base new services upon information stored in an inventory 110. The service creation database 108 and the inventory 110 will be described in more detail below. The operations management controller 106 also can instantiate scope control domain entities (e.g., controllers for infrastructure, network resources, and/or service functions), as will be explained in more detail below.

The operations management controller 106 can handle exceptions that can be generated by the operations management controller 106 and/or exceptions that may be passed to the operations management controller 106 from the scope control domain (e.g., the controllers for the infrastructure, network resources, and/or the service functions). The operations management controller 106 also can run a high level data collection, analytics, and event handling ("DCAE") process to analyze data relating to services and/or the various components for managing the services and/or its associated infrastructure, network, and service components. The operations management controller 106 also can run a policy decision function using a high level set of policies for service creation and/or control.

The service creation database 108 can define products and services using definitions of service components that can be referred to herein as "recipes." The recipes can specify one or more components of a service and a process or operations for putting the components together. Thus, the recipes may involve a service scope (e.g., a set of service functions), a network scope (e.g., a set of network functions and/or information indicating how network transport is to be established, maintained, and/or used), and an infrastructure scope (e.g., where on the network 104 the network and service functions are to be located). The service creation database 108 can be used by a service provider, by third parties, and/or by customers. It should be understood that this example is illustrative and therefore should not be construed as being limiting in any way.

The inventory 110 can maintain or reflect up-to-date information about resource utilization. The information can include a total number of resources, an amount of available resources, an amount of resources in use, or the like. It should be understood that the "resources" can include infrastructure resources, network resources, and/or service resources. Thus, the inventory 110 can be used to understand what resources exist, what resources are in use, and/or what resources are free or available.

According to various embodiments, the inventory 110 can reside entirely within a control domain, e.g., outside of the controllers illustrated and described herein. Thus, in some embodiments the inventory 110 can include data indicating or reflecting all inventory (infrastructure, network, and service) for the entire network 104 and/or the elements in communication with the network 104. Thus, the inventory 110 can provide end-to-end active view capability for active and/or inactive resources across all scopes of the control system 102.

In some other embodiments, the inventory 110 may be divided across the controllers so that each controller can have a local inventory that relates to that controller's scope. A controller for the infrastructure domain, for example, can maintain an infrastructure inventory. Similarly, controllers for network and service scopes can maintain scope-specific inventories. The inventory 110 still can provide end-to-end viewing capability for the divided inventory embodiment, if desired. It should be understood that this example is illustrative and therefore should not be construed as being limiting in any way.

According to various embodiments, the operations management controller 106 can communicate with one or more infrastructure control elements or controllers ("infrastructure control") 112. The infrastructure control 112 can manage assets of network infrastructure ("infrastructure") 114. Thus, the infrastructure control 112 can interact with the infrastructure 114 to instantiate virtual resources such as virtual machines and/or virtual storage devices. According to various embodiments, however, the infrastructure control 112 may not manage networking functions and/or service functions, as will be explained in more detail below.

The infrastructure control 112 can include and/or can execute a policy engine using an infrastructure set of policies. The infrastructure control 112 also can handle infrastructure scope exceptions, in some embodiments. The infrastructure control 112 can include functionality for managing and orchestrating the infrastructure 114; infrastructure EMFs, which may manage various fault, configuration, accounting, performance, and security ("FCAPS") capabilities; an infrastructure data, collection, analytics, and events ("DCAE") process (labeled as "INF DCAE" in FIG. 1) that can provide information to the controller and/or to the operations management controller 106; a policy decision function with infrastructure scope policies; and/or an infrastructure inventory function (labeled "INF Inventory" in FIG. 1) that can represent infrastructure-scoped inventory and usage information or provide this information to the inventory 110. It should be understood that this example is illustrative and therefore should not be construed as being limiting in any way.

The infrastructure control 112 can receive instructions and/or requests from the operations management controller 106 or other entities via an operations management application programming interface ("API") 116. As shown in FIG. 1, there can be multiple APIs 116 that can be called or accessed by various elements of the control system 102 to support the functionality illustrated and described herein. Although the APIs 116 are given the same reference numeral in the drawings, it should be understood that the APIs 116 can use different technologies to support calls to the various elements and/or to support the communications illustrated and described herein. According to some embodiments, the API 116 between the infrastructure control 112 and the operations management controller 106 can correspond to an operations management ("OM") API 116, though this is not necessarily the case.

Similarly, the infrastructure control 112 can communicate with a network control device or controller (hereinafter referred to as the "network control") 118 via a software defined networking ("SDN") API 116. Thus, it can be appreciated that the infrastructure control 112 and the network control 118 can support SDN and virtualization technologies simultaneously. As will be explained in more detail below, the network control 118 can be configured to create and manage virtual networking functions ("VNFs") 120 within the infrastructure 114. In some instances, the infrastructure control 112 also can load VM images with embedded VNFs 120 (e.g., a virtual switch) in addition to, or instead of, the network control 118. The functionality of the network control 118 will be described in more detail below.

The infrastructure control 112 also can communicate with the infrastructure 114 via an API 116. Thus, the infrastructure control 112 can interact with the infrastructure 114 to instantiate resources and/or allocate hardware to support various functions as illustrated and described herein. In addition to supporting the VNFs 120, the infrastructure 114 also can interact with a service control device or controller (hereinafter referred to as the "service control") 122 to receive instructions for instantiating one or more virtual service functions ("VSFs") 124 within the infrastructure 114. A VSF 124 can include a virtualized application or application component. The functionality of the service control 122 will be described in more detail below.

The operations management controller 106 also can communicate with the network control 118. The network control 118 can be responsible for management, deployment, operation, and coordination of a transport network for a particular service. According to various embodiments, the transport network can be created by creating a group of one or more VNFs 120 within the infrastructure 114. The transport network also can include physical network functions ("PNFs") 126, which can also be created and/or controlled by the network control 118. The transport network can include various VNFs 120, PNFs 126, and/or infrastructure networking functions such as European Telecommunications Standards Institute PNFs ("ETSI PNFs"). In some embodiments, the transport network may include other types of networking functions such as leaf switches, spine switches, or the like, while in some other embodiments, leaf switches and/or spine switches may be considered part of the infrastructure 114. The VNFs 120 can include virtualized network functions that can exist in the network scope. Thus, according to various embodiments, the VNFs 120 can include virtual switches ("vSwitches"), virtualized routing functions and/or virtual routers, a virtual tap, or the like. Because the transport network can include other types of functions, it should be understood that these examples are illustrative and therefore should not be construed as being limiting in any way.

The network control 118 also can establish and manage software defined networks, maintain a network scope resource inventory, run a network scope data collection and analysis process, run a policy engine using a network scope set of policies, and handle network scope exceptions. The network control 118 can include a software defined network controller; one or more virtual network function management functions; one or more network element management functions ("EMFs"), which can manage FCAPS for network scoped services; a network DCAE process (labeled as "NW DCAE" in FIG. 1), which can provide information to the network control 118 and/or the operations management controller 106; a network policy engine with network scope policies; and a network inventory function (labeled as "NW Inventory" in FIG. 1), which can provide network scoped inventory and usage information to the inventory 110.

According to various embodiments, the network control 118 can receive requests from the operations management controller 106 via an API 116 such as the OM API 116 discussed above. The requests from the operations management controller 106 received via the OM API 116 can instruct the network control 118 to create, modify, and/or terminate one or more networking functions such as VNFs 120, PNFs 126, and/or infrastructure networking functions. Infrastructure networking functions can include network hardware (e.g., wires, physical ports, switches, leaf switches and spine switches (if not controllable by SDN), or the like) and other infrastructure networking functions. The network control 118 also can be configured to receive instructions to establish or modify transport using VNFs 120 and/or PNFs 126 in addition to, or instead of, instantiating the VNFs 120 and/or the PNFs 126. It should be understood that this example is illustrative and therefore should not be construed as being limiting in any way.

The network control 118 also can initiate requests to the infrastructure control 112 via the OM API 116 to request and/or obtain additional network resources. For example, the network control 118 can request the infrastructure control 112 to allocate one or more virtual machines ("VMs") and load an image with an embedded VNF 120 to the VM. The network control 118 also can receive requests via an SDN API 116 from infrastructure control 112 to create, modify, and/or terminate transport. Thus, it can be appreciated that the network control 118 can support SDN and virtualization technologies simultaneously. It should be understood that this example is illustrative and therefore should not be construed as being limiting in any way.

The operations management controller 106 also can communicate with a service control 122. The service control 122 can be responsible for management, deployment, operation, and coordination of services. Services can be provided by and/or can include one or more VSFs 124 and/or non-virtualized service functions ("NVSFs") 128. According to various embodiments, the services and/or service components can be created by the service control 122 by creating a group of one or more VSFs 124 and/or NVSFs 128 within the infrastructure 114. Thus, it should be understood that the NVSFs 128 can be created and/or controlled by the service control 122.

According to various embodiments, the service control 122 also can maintain a service scope resource inventory (labeled "Ser Inventory" in FIG. 1). The service scope resource inventory can be maintained at the service control 122, in some embodiments, and can provide service scope resource inventory and usage information to the inventory 110. The service control 122 can also run a service scope DCAE (labeled as "Ser DCAE" in FIG. 1) to analyze messages and/or events occurring within or relating to services, service components, and/or service functions such as the VSFs 124 and the NVSFs 128.

The service control 122 also can run a policy engine for a service scope set of policies. Thus, service-specific policies can be applied and/or used by the service control 122 when creating services, service components, and/or service functions such as the VSFs 124 and/or the NVSFs 128. The service control 122 also can handle service scope exceptions, in some embodiments. It should be understood that these example components of the service control 122 are illustrative and therefore should not be construed as being limiting in any way.

The service control 122 can be responsible for management and control of services and/or the service components or functions. According to various embodiments, the service control 122 can manage VSFs 124 and/or NVSFs 128. The service control 122 also can handle service EMFs, which can manage FCAPS for service scoped services. The service DCAE process can provide information to the service control 122 and/or the operations management controller 106. The service control 122 also can include a service policy engine, which can apply and/or enforce service scope policies. The service inventory can provide service scope inventory and/or usage information to the inventory 110.

According to various embodiments, the service control 122 can receive requests from the operations management controller 106 via an API 116 such as the OM API 116 discussed above. The requests from the operations management controller 106 received via the OM API 116 can instruct the service control 122 to create, modify, and/or terminate one or more service functions such as VSFs 124, the NVSFs 128, and the like. It should be understood that this example is illustrative and therefore should not be construed as being limiting in any way.

The service control 122 also can initiate requests to the infrastructure control 112 via the OM API 116 to request and/or obtain additional infrastructure resources and/or other resources. The service control 122 also can initiate requests via an SDN API 116 to the network control 118. Thus, it can be appreciated that the service control 122 can support SDN and virtualization technologies simultaneously. These requests can be configured to request creation, modification, and/or termination of service related transport (e.g., transport between service functions and/or service control functions). It should be understood that this example is illustrative and therefore should not be construed as being limiting in any way.

The APIs 116 illustrated and described herein can include two or more types of APIs 116. In some embodiments, as mentioned above, the APIs 116 can include an OM API 116 and/or SDN APIs 116. The APIs 116 can be exposed by some or all of the components within the control system 102. The APIs 116 can be exposed by the components to each other, for various purposes. For example, the APIs 116 can include an operations management API 116, which can be exposed by the operations management controller 106; infrastructure APIs 116, which can be exposed by the infrastructure control 112; network APIs 116, which can be exposed by the network control 118; and service APIs 116, which can be exposed by the service control 122. Thus, it can be appreciated that the control system 102 and the components thereof can support SDN and virtualization technologies simultaneously.

The APIs 116 can be used to enable operational management within the control system 102 and between the control system 102 and the infrastructure 114. The APIs 116 can be exposed in either direction. As such, the APIs 116 can be exposed in a southbound direction, e.g., from the operations management controller 106 to the infrastructure control 112, the network control 118, or the service control 122; from the infrastructure control 112 to the infrastructure 114; from the network control 118 to the VNFs 120 loaded to the infrastructure 114; and/or from the service control 122 to the VSFs 124 loaded to the infrastructure 114. The APIs 116 also can enable communications in a northbound direction, e.g., the APIs 116 can enable the VNFs 120 to access the network control 118; the VSFs 124 to access or communicate with the service control 122; and the infrastructure 114 to access the infrastructure control 112. Similarly, the APIs 116 can be accessed by the infrastructure control 112, the network control 118, and/or the service control 122 to enable access to the operations management controller 106. It should be understood that this example is illustrative and therefore should not be construed as being limiting in any way.

The SDN APIs 116 can be exposed by the network control 118 to the operations management controller 106, the infrastructure control 112, and the service control 122. The SDN APIs 116 can enable the operations management controller 106, the infrastructure control 112, and the service control 122 to make requests to the network control 118 for SDN services. It should be understood that this example is illustrative and therefore should not be construed as being limiting in any way. By creating, allocating, and/or instantiating the VNFs 120, the PNFs 126, the VSFs 124 and/or the NVSFs 128, the control system 102 can create a service 130. It should be understood that this example is illustrative and therefore should not be construed as being limiting in any way.

According to various embodiments, the control system 102 can integrate an enhanced control, orchestration, management, and policy framework (hereinafter referred to as "ECOMP") 132, which can be integrated into the control system 102. The ECOMP 132 can enable rapid service creation by combining pre-built components and/or functions. The ECOMP 132 also can enable dynamically elastic capacity management by enabling scaling and instantiation. The ECOMP 132 also can support control functions. The control functions can be driven by real-time analytics and policy decisions. The ECOMP 132 also can support unified operations, administration, and management across the three scopes (e.g., infrastructure, network, and service). The ECOMP 132 also can support optimization of services 130 and/or the components, as well as analytics of the services 130, components thereof, and/or the various components of the control system 102. As illustrated and described in the FIGURES, the ECOMP 132 can be an element of the control system 102, in some embodiments, while in other embodiments the control system 102 can correspond to an embodiment of the ECOMP 132. It should be understood that these examples are illustrative and therefore should not be construed as being limiting in any way.

The ECOMP 132 can include a service design and creation ("SDC") environment, an active and available inventory ("AAI"), an operations management framework ("OMF"), and/or a service, infrastructure, and/or network control. Thus, the ECOMP 132 can include, in some embodiments, the service creation database 108, the inventory 110, the operations management controller 106, and/or one or more of the infrastructure control 112, the network control 118, and/or the service control 122. It should be understood that this example is illustrative and therefore should not be construed as being limiting in any way.

The SDC component of the ECOMP 132 can enable developers, service designers, network planners/engineers, operations planners and product managers, other entities, or the like, to create, organize, prototype, and deploy services 130. In some embodiments, service definitions can be instantiated by the OMF and then can be recorded in the AAI. It should be understood that this example is illustrative and therefore should not be construed as being limiting in any way.

The AAI can provide real-time views of services, infrastructure, and networks in aggregate. The AAI can obtain the data from the service control 122 and the network control 118, and/or can supplement views with customer and account data. The OMF can provide and extend upon FCAPS capabilities through the use of analytics, policy, orchestration, and control functions. The OMF can be a repeating pattern of control, orchestration, DCAE, and policy management functions. It should be understood that this example is illustrative and therefore should not be construed as being limiting in any way.

In some embodiments, the OMF and service, infrastructure, and network control functions can form a series of closed loop control capabilities. These capabilities can be referred to as "operational control loops." These "operational control loops" can be based on data and events collected and analyzed via the DCAE. Responsive actions can be based upon policy, and may be taken by one or more of orchestration or controller functions. "Operational control loops" can be repeating patterns that may be implemented in various locations and supporting various scopes of operation.

In some embodiments, the OMF can interact with one or more business support system ("BSS") 134 and one or more operations support system ("OSS") 136. The BSS 134 and the OSS 136 can be external to the ECOMP 132, in some embodiments. The BSS 134 and the OSS 136 can interact with customers and operations in support of activities and aggregate capabilities across UDNC and non-UDNC services.

Each instantiation of the OMF can be specifically tailored to the scope in which the OMF operates. The OMF may exist as a top-level end-to-end function that can be separate from service, infrastructure, and network control, and the platform components of the OMF may exist in various places within service and network control. It should be understood that this example is illustrative and therefore should not be construed as being limiting in any way.

As mentioned above, although the operations management controller 106, the service creation database 108, the inventory 110, the infrastructure control 112, the network control 118, the service control 122, and the ECOMP 132 are illustrated as components of the control system 102, it should be understood that each of these components, or combinations thereof, may be embodied as or in stand-alone devices or components thereof operating as part of or in communication with the network 104 and/or the control system 102. Thus, for example one or more of these components can be hosted by a server computer or other computing device that can access other devices via one or more of the APIs 116, and/or can be accessed via one or more of the APIs 116. As such, the illustrated embodiment should be understood as being illustrative of only some contemplated embodiments and should not be construed as being limiting in any way.

In practice, the operations management controller 106 can detect or determine that a change is to be made to a service 130. According to various embodiments, the operations management controller 106 can detect an impending capacity change associated with a service 130, a request to configure or reconfigure a service 130, or a request for a new service 130. In some embodiments of creating or scaling services 130, the operations management controller 106 can analyze one or more policies to determine how the scaling or creation of the service 130 should be handled. The operations management controller 106 also can access the service creation database 108 to identify one or more "recipes" that can be used to scale or create the service 130.

The recipes can define service components including hardware, software, and/or transport.

The operations management controller 106 can access the inventory 110 to determine if the resources needed to support the new or scaled service 130 are available for use. The operations management controller 106 also can identify a service control 122 that is to handle the scaled or created service 130. It can be appreciated that in some embodiments, a scaled service 130 may be controlled by a service control 122 that already is controlling the service 130. The operations management controller 106 can select, allocate, and/or create the service control 122.

The operations management controller 106 also can instruct the infrastructure control 112 to instantiate one or more VMs and to load and validate VNFs 120 and/or VSFs 124 to the VMs. It should be understood that if the service is being scaled down, that the infrastructure control 112 may de-allocate VMs, VNFs 120, and/or VSFs 124 instead of instantiating the VMs, VNFs 120, and/or VSFs 124. The infrastructure control 112 can also instruct the network control 118 to create or establish transport between the VMs, the VNFs 120, the VSFs 124, and/or the service control 122. In the case of scaled down services 130, it can be appreciated that the network control 118 may de-allocate or tear down transport. The network control 118 can report the event to the network DCAE and/or update the network inventory (and/or the inventory 110).

The service control 122 can receive instructions from the operations management controller 106 to instantiate or tear down one or more VSFs 124. The service control 122 can report the event to a service DCAE and update the service inventory (and/or the inventory 110). The network control 118 also can receive instructions to establish transport between the new VSFs 124 and report the event to the network DCAE for scaled up services 130 and/or to tear down the VSFs 124 and report those events to the network DCAE for scaled down services 130. The network control 118 can establish transport using VNFs 120 and/or PNFs 126. The operations management controller 106 can validate the scaled or created service 130 end-to-end and/or update the inventory 110.

Embodiments for scaling the service 130 at the service control 122 also are disclosed. The embodiments for scaling the service 130 at the service control 122 can be substantially similar in functionality, though the operations can occur at different elements of the control system 102. Aspects of the concepts and technologies described herein for scaling a service 130 at a service control 122 will be illustrated and described below, primarily with reference to FIG. 4. It should be understood that this example is illustrative and therefore should not be construed as being limiting in any way.

FIG. 1 illustrates one control system 102, one network 104, one operations management controller 106, one service creation database 108, one inventory 110, one infrastructure control 112, one instance of infrastructure 114, one network control 118, one service control 122, one service 130, one ECOMP 132, one BSS 134, and one OSS 136. It should be understood, however, that various implementations of the operating environment 100 can include zero, one, or more than one control system 102; zero, one, or more than one network 104; zero, one, or more than one operations management controller 106; zero, one, or more than one service creation database 108; zero, one, or more than one inventory 110; zero, one, or more than one infrastructure control 112; zero, one, or more than one instance of infrastructure 114; zero, one, or more than one network control 118; zero, one, or more than one service control 122; zero, one, or more than one service 130; zero, one, or more than one ECOMP 132; zero, one, or more than one BSS 134, and zero, one, or more than one OSS 136. As such, the illustrated embodiment should be understood as being illustrative, and should not be construed as being limiting in any way.

According to various embodiments, the concepts and technologies described herein can support abstraction of services 130. In some embodiments, abstraction includes the ability to decouple the services 130 from the underlying infrastructure 114 and the network 104. This decoupling can enable the services 130 to be created and managed without detailed knowledge of the underlying infrastructure 114 and physical connectivity. Additionally, abstraction can enable the scale at which a virtualized service 130 is delivered to become a function of the infrastructure 114 as opposed to a function of the design of the service 130. As such, scalability may not need to be considered during design of the service 130.

In some embodiments, abstraction also can simplify creation of the service 130 and management of the service 130 because the requirements of the infrastructure 114 may not need to be considered during design of the service 130. Similarly, abstraction can allow for novel business models since ownership of services 130, network 104, and infrastructure 114 by a single provider may no longer be necessary. Still further, abstraction can allow abstracting a service from network connectivity. Finally, abstraction can allow infrastructure 114 to be deployed before services 130 are needed and/or before services 130 are planned, which can reduce cycle times. It should be understood that these examples are illustrative and therefore should not be construed as being limiting in any way.

According to some embodiments of the concepts and technologies described herein, the control system 102 can support modularity. Modularity can enable composition of new services 130 by creating new combinations of existing network functions (e.g., VNFs 120, PNFs 126, or the like). Modularity also can allow for flexible reuse of infrastructure, network, and service components. Finally, modularity can allow services 130 to be instantiated through the use of recipes. The recipes can define infrastructure, network, and service functions to be used to provide a service 130.

According to some embodiments, the concepts and technologies described herein can help realize cost savings in creation and management of services 130. In particular, embodiments of the concepts and technologies described herein can realize cost savings by using infrastructure 114 composed of common off-the-shelf ("COTS") hardware. Using COTS hardware can result in cost savings by providing a large ecosystem of network software providers. The cost savings also can be realized by managing common infrastructure platforms, the ability to place virtualized network functions (VNFs 120) on non-owned infrastructure 114, and an increased efficiency of resource utilization. Finally, cost savings also can be realized from allowing the underlying network 104 and infrastructure 114 to be optimized, changed, and upgraded independent of service definition and management. It should be understood that these examples are illustrative and therefore should not be construed as being limiting in any way.

Figure 2:
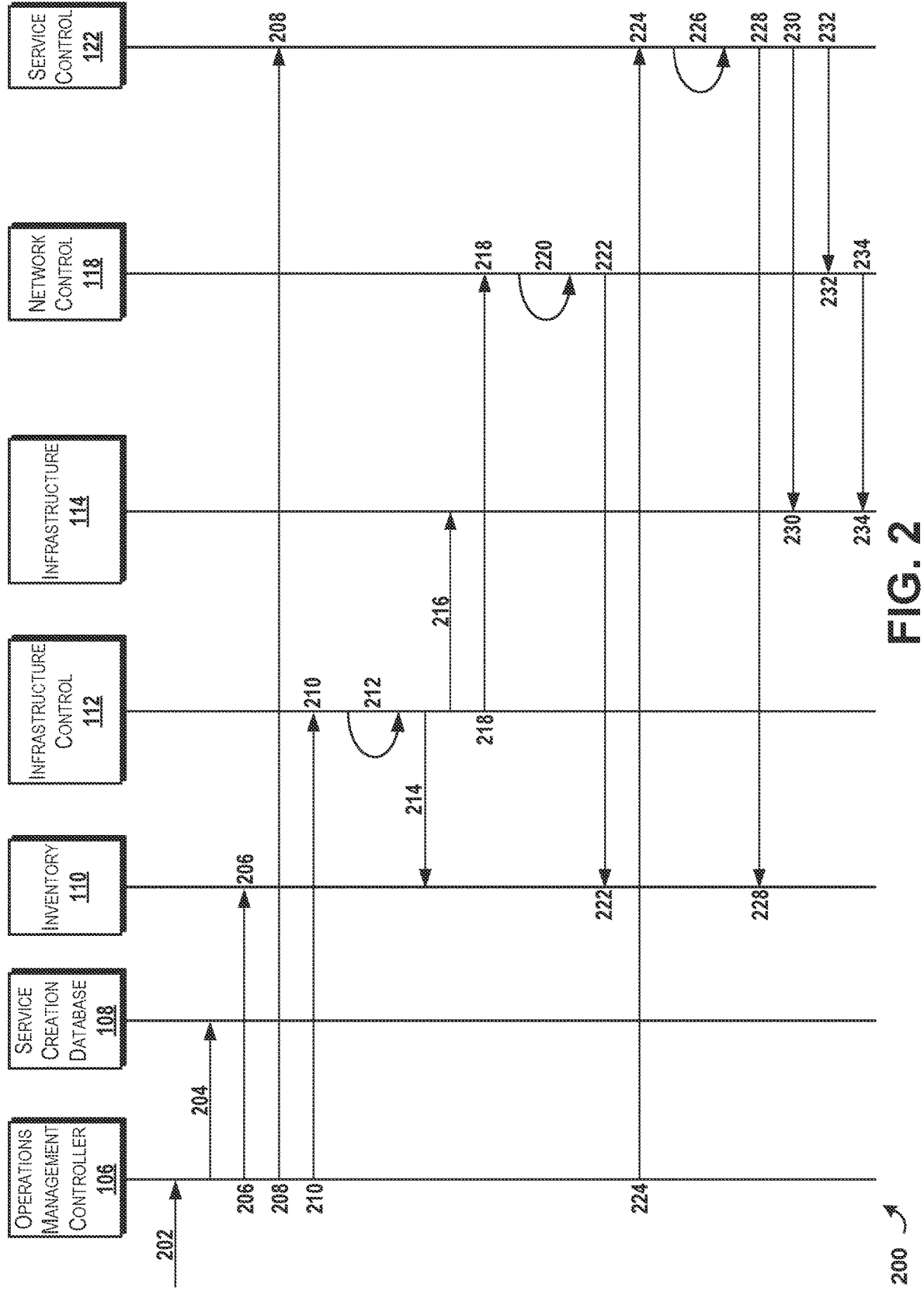
FIG. 2 is a diagram showing aspects of a method for instantiating a new service, according to an illustrative embodiment of the concepts and technologies described herein.

Turning now to FIG. 2, aspects of a method 200 for instantiating a new service 130 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to a) causing a processor of a computing system or device, such as a device that provides the functionality of the operations management controller 106, the infrastructure control 112, the network control 118, and/or the service control 122, including an integrated ECOMP 132 if included, to perform one or more operations and/or b) causing the processor to direct other components of the computing system or device to perform one or more of the operations.

For purposes of illustrating and describing the concepts of the present disclosure, the methods disclosed herein are described as being performed by one or more elements of the control system 102 via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 begins at operation 202. At operation 202, the operations management controller 106 can receive a request for a new service 130. It should be understood that the operations management controller 106 can detect the request in operation 202 or receive the request. The request received in operation 202 can correspond to a request for creation of the new service 130. In response to the request (or detecting the request), the operations management controller 106 can begin operations as illustrated and described herein. At operation 202, the operations management controller 106 also can check one or more policy rules to determine how a service 130 such as the new service 130 requested by way of the request detected or received in operation 202 should be created and/or various features, requirements, architecture, resources, and/or operational framework associated with such a service 130.

From operation 202, the method 200 proceeds to operation 204. At operation 204, the operations management controller 106 can access the service creation database 108 to determine if one or more recipes for the service 130 exist in the service creation database 108. In some embodiments, the operations management controller 106 can search the recipes and/or execute queries against the recipes to determine if recipes exist for accomplishing the desired tasks and/or for providing functionality requested in the new service 130. Because the operations management controller 106 can determine that the recipes for the service 130 exist or do not exist in additional and/or alternative ways, it should be understood that these examples are illustrative and therefore should not be construed as being limiting in any way.

From operation 204, the method 200 proceeds to operation 206. At operation 206, the operations management controller 106 can access the inventory 110 and determine, based upon the recipe identified in operation 206, what resources will be needed for the service 130 and/or if the needed resources are available. From operation 206, the method 200 proceeds to operation 208. At operation 208, the operations management controller 106 can select a service control 122 for the service 130. In some embodiments, if the operations management controller 106 determines that a service control 122 for the service 130 does not exist, the operations management controller 106 can create a new service control 122 for the service 130. It should be understood that this example is illustrative and therefore should not be construed as being limiting in any way. In operation 208, the service control 122 can be instantiated or created by the operations management controller 106, though this is not necessarily the case.

From operation 208, the method 200 proceeds to operation 210. At operation 210, the operations management controller 106 can send instructions to the infrastructure control 112 to instantiate one or more virtual machines ("VMs"). The instructions sent in operation 210 also can include instructions to load and validate images with embedded VSFs 124, in some instances. Thus, operation 210 also can include the infrastructure control 112 receiving the instructions to instantiate the VMs and/or instructions to load and validate images with embedded VSFs 124. In addition to instantiating VMs and/or loading images, operation 210 also can include the infrastructure control 112 instantiating VMs, configuring hypervisors, allocating compute and storage resources, and the like. It should be understood that this example is illustrative and therefore should not be construed as being limiting in any way.

From operation 210, the method 200 proceeds to operation 212. At operation 212, the infrastructure control 112 can report the event to an infrastructure level DCAE process and update the infrastructure inventory. As explained above, the infrastructure control 112 also can be configured to update the inventory 110, as shown at operation 214. It therefore should be understood that operation 214 can include the infrastructure control 112 updating the inventory 110, the inventory 110 updating itself, and/or the infrastructure control 112 updating an infrastructure inventory. It should be understood that these examples are illustrative and therefore should not be construed as being limiting in any way.

From operation 214, the method 200 proceeds to operation 216. At operation 216, the infrastructure control 112 can instantiate the VMs as instructed in operation 210. In operation 216, the infrastructure control 112 can instantiate the VMs on the infrastructure 114. Furthermore, it can be appreciated that if the images with embedded VSFs 124 are used, that operation 216 can include the infrastructure control 112 instantiating the VMs with embedded VSFs 124 on the infrastructure 114. It should be understood that these examples are illustrative and therefore should not be construed as being limiting in any way.

From operation 216, the method 200 proceeds to operation 218. At operation 218, the infrastructure control 112 can send instructions to the network control 118, and the network control 118 can receive the instructions from the infrastructure control 112. The instructions received and sent in operation 218 can correspond to instructions to establish transport between the VMs and/or VSFs 124 created in operation 216, as well as transport between the VMs and VSFs 124 and the service control 122 created in operation 208. While operation 218 is illustrated as being initiated by the infrastructure control 112, it should be understood that in some embodiments, the operations management controller 106 can instead initiate operation 218. As such, the illustrated embodiment should not be construed as being limiting in any way.

From operation 218, the method 200 proceeds to operation 220. At operation 220, the network control 118 can report the event to a network scope DCAE process. From operation 220, the method 200 proceeds to operation 222. At operation 222, the network control 118 can update the network level inventory. As explained above, the network control 118 also can be configured to update the inventory 110, as shown at operation 222. It therefore should be understood that operations 220-222 can include the network control 118 updating the inventory 110, the inventory 110 updating itself, and/or the network control 118 updating a network level inventory. It should be understood that these examples are illustrative and therefore should not be construed as being limiting in any way.

From operation 222, the method 200 proceeds to operation 224. At operation 224, the operations management controller 106 can send instructions to the service control 122 and the service control 122 can receive the instructions. The instructions sent and received in operation 224 can correspond to or include instructions to instantiate and configure one or more VSFs 124 for providing the service 130. From operation 224, the method 200 proceeds to operation 226. At operation 226, the service control 122 can report the event to a service scope DCAE process.

From operation 226, the method 200 proceeds to operation 228. At operation 228, the service control 122 can update the service level inventory. As explained above, the service control 122 also can be configured to update the inventory 110, as shown at operation 228. It therefore should be understood that operation 228 can include the service control 122 updating the inventory 110, the inventory 110 updating itself, and/or the service control 122 updating a service level inventory. It should be understood that these examples are illustrative and therefore should not be construed as being limiting in any way.

From operation 228, the method 200 proceeds to operation 230. At operation 230, the service control 122 can establish and configure one or more VSFs 124 and/or NVSFs 128, which can reside on the infrastructure 114. It should be understood that in various embodiments, the service control 122 may not configure the infrastructure 114 itself. Thus, operation 230 can correspond to the service control 122 instantiating service functions on the resources or other infrastructure 114. It should be understood that this example is illustrative and therefore should not be construed as being limiting in any way.

From operation 230, the method 200 proceeds to operation 232. At operation 232, the service control 122 can send instructions to the network control 118 and the network control 118 can receive the instructions from the service control 122. The instructions sent/received in operation 230 can correspond to instructions to establish transport between the VSFs 124. Although not separately illustrated in FIG. 2, the network control 118 can report the event to the network scope DCAE process and update the network level inventory. As explained above, the network control 118 also can be configured to update the inventory 110. It should be understood that these examples are illustrative and therefore should not be construed as being limiting in any way. While operation 232 is illustrated as being initiated by the service control 122, it should be understood that in some embodiments, the operations management controller 106 can instead initiate operation 232. As such, the illustrated embodiment should not be construed as being limiting in any way.

From operation 232, the method 200 proceeds to operation 234. At operation 234, the network control 118 can establish the transport requested in operation 232. Thus, in operation 234, the network control 118 can load one or more VNFs 120 and/or PNFs 126 to the infrastructure 114. Although not shown separately in FIG. 2, the operations management controller 106 can perform end-to-end validation of the new service 130, in some embodiments. In some other embodiments, each of the infrastructure control 112, the network control 118, and/or the service control 122 can perform validation on functions or resources associated with those controllers. Also, though not separately shown in FIG. 2, the operations management controller 106 can also update the inventory 110 in addition to, or instead of, each of the controllers updating an associated inventory. It should be understood that this example is illustrative and therefore should not be construed as being limiting in any way. The method 200 can end, in some embodiments, after operation 234.

Figure 3:
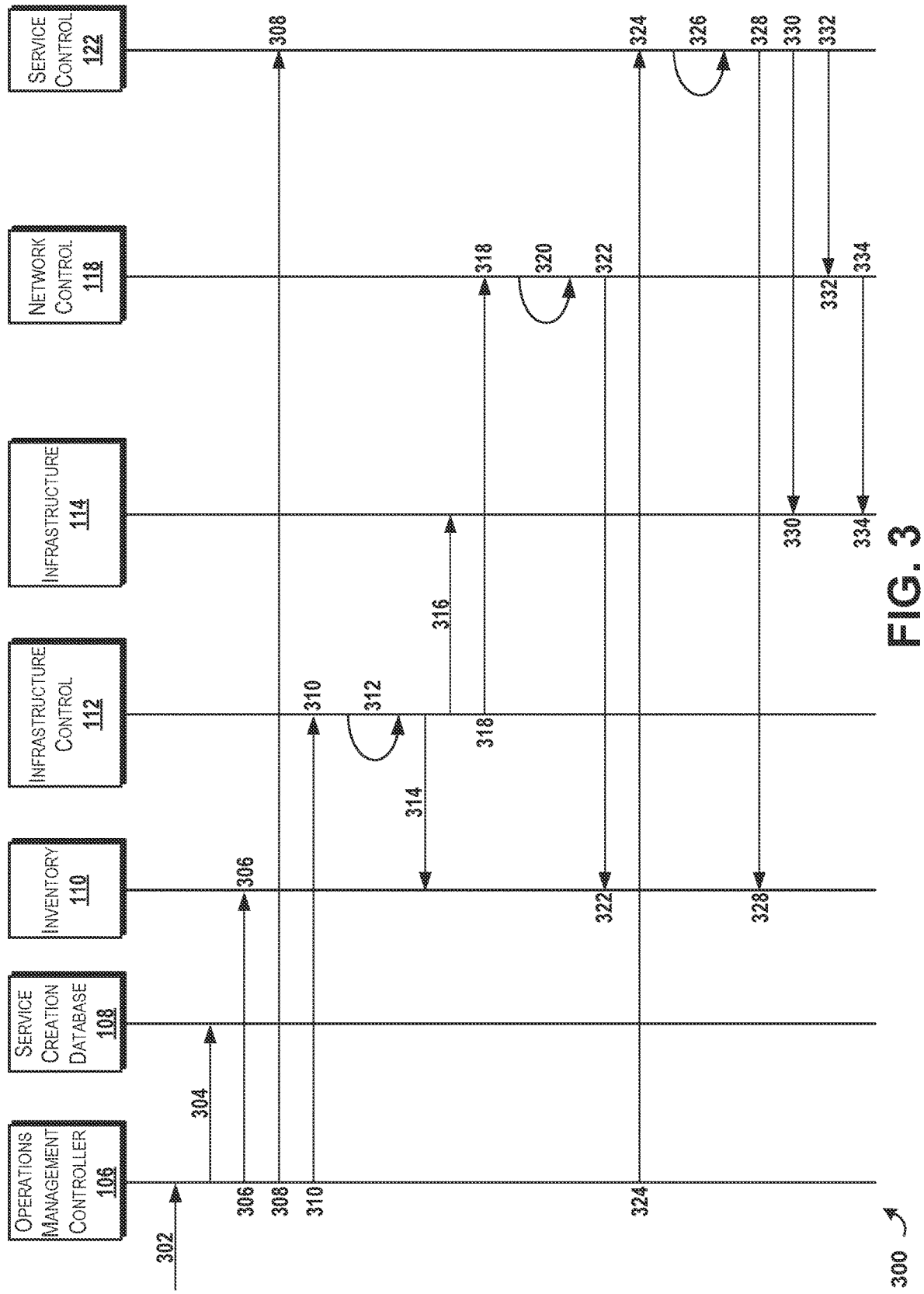
FIG. 3 is a diagram showing aspects of a method for scaling a service, according to an illustrative embodiment of the concepts and technologies described herein.

Turning now to FIG. 3, aspects of a method 300 for scaling a service 130 will be described in detail, according to an illustrative embodiment. The method 300 begins at operation 302. At operation 302, the operations management controller 106 can detect a capacity event associated with a service 130. The capacity event detected in operation 302 can correspond to a need for more capacity for the service 130, to a determination that less capacity is required for the service 130, or the like. It should be understood that the operations management controller 106 can detect the capacity event at operation 302 by monitoring the service 130 end-to-end as illustrated and described above, or by receiving data from other entities on the network 104 and/or in communication with the service 130 and/or the operations management controller 106. In response to the detecting the capacity request, the operations management controller 106 can check one or more policy rules to determine how a service 130 such as the new service 130 should be scaled when capacity events are detected, features for the scaled service, requirements of the scaled service, architecture associated with the scaled service, resources that will support the scaled service, and/or an operational framework associated with the scaled service. It should be understood that the policies can be checked for additional and/or alternative reasons, and as such, this embodiment should not be construed as being limiting in any way.

From operation 302, the method 300 proceeds to operation 304. At operation 304, the operations management controller 106 can access the service creation database 108 to determine if one or more recipes for the service 130 exist in the service creation database 108. In some embodiments, the operations management controller 106 can search the recipes and/or execute queries against the recipes to determine if recipes exist for scaling the service 130 in response to the detected capacity event. Because the operations management controller 106 can determine that the recipes for the service 130 exist or do not exist in additional and/or alternative ways, it should be understood that these examples are illustrative and therefore should not be construed as being limiting in any way.

From operation 304, the method 300 proceeds to operation 306. At operation 306, the operations management controller 106 can access the inventory 110 and determine, based upon the recipe identified in operation 306, what resources will be needed to scale the service 130 and/or if the needed resources are available. In some embodiments, the operations management controller 106 can determine what resources are needed for a scaled version of the service 130, and then determine if the needed resources are or are not available. It should be understood that this example is illustrative and therefore should not be construed as being limiting in any way.

From operation 306, the method 300 proceeds to operation 308. At operation 308, the operations management controller 106 can select a service control 122 for the scaled version of the service 130. As with service creation, the operations management controller 106 can create a new service control 122 for the service 130, in some embodiments. In operation 308, the service control 122 can be instantiated or created by the operations management controller 106, though this is not necessarily the case. If the operations management controller 106 determines that the same service control 122 will be used after the scaling is complete, it can be appreciated that the service control 122 may not need to be instantiated or created.

From operation 308, the method 300 proceeds to operation 310. At operation 310, the operations management controller 106 can send instructions to the infrastructure control 112 to instantiate one or more virtual machines ("VMs"). It can be appreciated that new VMs can be instantiated in cases in which the service 130 is being scaled up. The instructions sent in operation 310 also can include instructions to load and validate images with embedded VSFs 124, as explained above with reference to FIG. 2. Thus, operation 310 also can include the infrastructure control 112 receiving the instructions to instantiate the VMs and/or instructions to load and validate images with embedded VSFs 124. In addition to instantiating VMs and/or loading images, operation 310 also can include the infrastructure control 112 instantiating VMs, configuring hypervisors, allocating compute and storage resources, and the like. If the service 130 is being scaled down, the instructions sent in operation 310 can correspond to instructions for de-allocating VMs. It should be understood that this example is illustrative and therefore should not be construed as being limiting in any way.

From operation 310, the method 300 proceeds to operation 312. At operation 312, the infrastructure control 112 can report the event to an infrastructure level DCAE process. In operation 312, the infrastructure control 112 also can update the infrastructure inventory, if included. As explained above, the infrastructure control 112 also can be configured to update the inventory 110, as shown at operation 314. Thus, operation 314 can include the infrastructure control 112 updating the inventory 110, the inventory 110 updating itself, and/or the infrastructure control 112 updating an infrastructure inventory. It should be understood that these examples are illustrative and therefore should not be construed as being limiting in any way.

From operation 314, the method 300 proceeds to operation 316. At operation 316, the infrastructure control 112 can instantiate the VMs as instructed in operation 310. In operation 316, the infrastructure control 112 can instantiate the VMs on the infrastructure 114 if the service 130 is being scaled up, or de-allocate the VMs on the infrastructure 114 if the service 130 is being scaled down. Furthermore, it can be appreciated that if the images with embedded VSFs 124 are used, that operation 316 can include the infrastructure control 112 instantiating the VMs with embedded VSFs 124 on the infrastructure 114, or de-allocating VMs with embedded VSFs 124. It should be understood that these examples are illustrative and therefore should not be construed as being limiting in any way.

From operation 316, the method 300 proceeds to operation 318. At operation 318, the infrastructure control 112 can send instructions to the network control 118, and the network control 118 can receive the instructions from the infrastructure control 112. The instructions received and sent in operation 318 can correspond to instructions to establish transport between the VMs and/or VSFs 124 created in operation 316, as well as transport between the VMs and VSFs and the service control 122 created in operation 308. It can be appreciated that establishing transport can correspond to instances in which the service 130 is scaling up. If, however, the service 130 is being scaled down, operation 318 can correspond to the network control 118 receiving instructions to tear down or de-allocate transport functions or mechanisms between VMs, VSFs 124, and/or the service control 122. While operation 318 is illustrated as being initiated by the infrastructure control 112, it should be understood that the operations management controller 106 can instead initiate operation 318, in some embodiments. As such, the illustrated embodiment should not be construed as being limiting in any way.

From operation 318, the method 300 proceeds to operation 320. At operation 320, the network control 118 can report the event to a network scope DCAE process. From operation 320, the method 300 proceeds to operation 322. At operation 322, the network control 118 can update the network level inventory to reflect the new resources created, or the resources de-allocated. As explained above, the network control 118 also can be configured to update the inventory 110, as shown at operation 322. It therefore should be understood that operation 322 can include the network control 118 updating the inventory 110, the inventory 110 updating itself, and/or the network control 118 updating a network level inventory. It should be understood that these examples are illustrative and therefore should not be construed as being limiting in any way.

From operation 322, the method 300 proceeds to operation 324. At operation 324, the operations management controller 106 can send instructions to the service control 122 and the service control 122 can receive the instructions. The instructions sent and received in operation 324 can correspond to or include instructions to instantiate and configure one or more VSFs 124 for providing the service 130 that is to be scaled up, or to de-allocating one or more VSFs 124 used to provide the service 130 that is being scaled down.

From operation 324, the method 300 proceeds to operation 326. At operation 326, the service control 122 can report the event to a service scope DCAE process. From operation 326, the method 300 proceeds to operation 328. At operation 328, the service control 122 can update the service level inventory. As explained above, the service control 122 also can be configured to update the inventory 110, as shown at operation 328. It therefore should be understood that operations 328 can include the service control 122 updating the inventory 110, the inventory 110 updating itself, and/or the service control 122 updating a service level inventory. It should be understood that these examples are illustrative and therefore should not be construed as being limiting in any way.

From operation 328, the method 300 proceeds to operation 330. At operation 330, the service control 122 can establish and configure one or more VSFs 124 and/or NVSFs 128, which can reside on the infrastructure 114 if the service 130 is being scaled up, or de-allocate and/or tear down one or more VSFs 124 and/or NVSFs 128 if the service 130 is being scaled down. Thus, operation 330 can correspond to the service control 122 instantiating service functions on the resources or other infrastructure 114, or de-allocating the service functions. It should be understood that this example is illustrative and therefore should not be construed as being limiting in any way.

From operation 330, the method 300 proceeds to operation 332. At operation 332, the service control 122 can send instructions to the network control 118 and the network control 118 can receive the instructions from the service control 122. The instructions sent/received in operation 330 can correspond to instructions to establish transport between the VSFs 124 (for scaled up services 130) and/or tearing down or eliminating transport between the VSFs 124 for services 130 being scaled down. Although not separately illustrated in FIG. 3, the network control 118 can report the event to the network scope DCAE process and update the network level inventory. As explained above, the network control 118 also can be configured to update the inventory 110. It should be understood that these examples are illustrative and therefore should not be construed as being limiting in any way. While operation 332 is illustrated as being initiated by the service control 122, it should be understood that in some embodiments, the operations management controller 106 can instead initiate operation 332. As such, the illustrated embodiment should not be construed as being limiting in any way.

From operation 332, the method 300 proceeds to operation 334. At operation 334, the network control 118 can establish the transport requested in operation 332 or tear down or eliminate the transport identified in operation 332. Thus, in operation 334, the network control 118 can load one or more VNFs 120 and/or PNFs 126 to the infrastructure 114, de-allocate or unload one or more VNFs 120 and/or PNFs 126 from the infrastructure 114, combinations thereof, or the like.

Although not shown separately in FIG. 3, the operations management controller 106 can perform end-to-end validation of the scaled service 130, in some embodiments. In some other embodiments, each of the infrastructure control 112, the network control 118, and/or the service control 122 can perform validation on functions or resources associated with those controllers. Also, though not separately shown in FIG. 3, the operations management controller 106 can update the inventory 110 in addition to, or instead of, each of the controllers updating an associated inventory. It should be understood that this example is illustrative and therefore should not be construed as being limiting in any way. The method 300 can end, in some embodiments, after operation 334.

Figure 4:
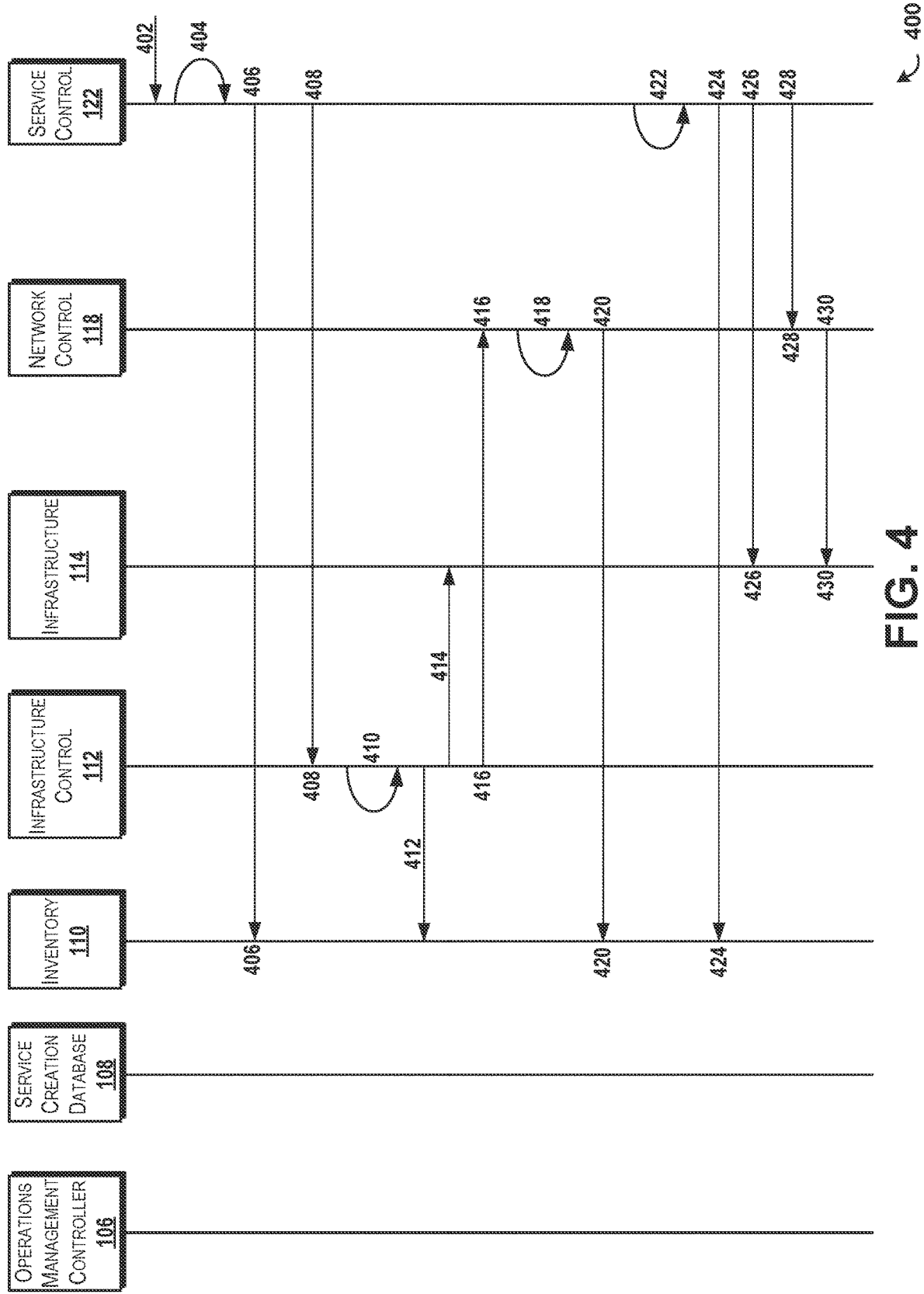
FIG. 4 is a diagram showing aspects of a method for scaling a service, according to another illustrative embodiment of the concepts and technologies described herein.

Turning now to FIG. 4, aspects of a method 400 for scaling a service 130 will be described in detail, according to an illustrative embodiment. Whereas the method 300 discussed scaling being initiated from the operations management controller 106, the method 400 describes scaling being initiated from the service control 122.

At operation 402, the service control 122 can detect a capacity event associated with a service 130. The capacity event detected in operation 402 can correspond to a need to scale up the service 130 (e.g., that more capacity for the service 130 is needed), to a need to scale down the service 130 (e.g., that less capacity is required for the service 130), or other types of scaling and/or reallocation (e.g., adding redundancy, moving functions to resources based on location, combinations thereof, or the like). It should be understood that scaling can be performed as part of relocation of services 130 and/or service components. For example, a service 130 or component may be relocated to new infrastructure 114, which can effectively result in creation of a service 130 or component at a new location and scaling down of the service 130 at the previous location. It should be understood that this example is illustrative and therefore should not be construed as being limiting in any way.

In operation 402, the service control 122 can detect the capacity event illustrated in operation 402 by receiving a message from the service functions and/or other components of the infrastructure 114 such as VSFs 124, NVSFs 128, or by receiving data from other entities on the network 104 and/or in communication with the service 130 and/or the service control 122. In response to the detecting the capacity impending capacity change or event, the service control 122 can check one or more policy rules to determine how a service 130 such as the new service 130 should be scaled when capacity events are detected. In some other embodiments, the service control 122 can analyze one or more graphs to determine how to respond to the capacity event instead of, or in addition to, analyzing the policies. Thus, in operation 402, the service control 122 can identify resources that should be scaled up or down.

From operation 402, the method 400 proceeds to operation 404. At operation 404, the service control 122 can access a local inventory such as the service inventory to verify that the resources determined to be needed in operation 402 are available. In some embodiments, the service control 122 can determine what resources are needed for a scaled version of the service 130 in operation 402, and then determine if the needed resources are or are not available in operation 404. It should be understood that this example is illustrative and therefore should not be construed as being limiting in any way. In some embodiments, as illustrated at operation 406, the service control 122 can determine what resources are available by accessing the inventory 110, though this is not necessarily the case. As such, it should be understood that operation 406 can be omitted in various embodiments.

From operation 404 or 406, the method 400 proceeds to operation 408. At operation 408, the service control 122 can send instructions to the infrastructure control 112 to instantiate one or more virtual machines ("VMs") that may be needed to support a scaled up service 130 and/or to tear down or de-allocate one or more VMs that may no longer be needed to support a scaled down service 130. As explained above, the instructions sent in operation 408 also can include instructions to load and validate images with embedded VSFs 124 for scaled up services 130 and/or instructions for de-allocating VMs and/or embedded VSFs 124 for services 130 being scaled down. It should be understood that this example is illustrative and therefore should not be construed as being limiting in any way.

From operation 408, the method 400 proceeds to operation 410. At operation 410, the infrastructure control 112 can report the event to an infrastructure level DCAE process. In operation 410, the infrastructure control 112 also can update the infrastructure inventory, if included. As explained above, the infrastructure control 112 also can be configured to update the inventory 110, as shown at operation 412. Thus, operation 412 can include the infrastructure control 112 updating the inventory 110, the inventory 110 updating itself, and/or the infrastructure control 112 updating an infrastructure inventory. It should be understood that these examples are illustrative and therefore should not be construed as being limiting in any way.

From operation 412, the method 400 proceeds to operation 414. At operation 414, the infrastructure control 112 can instantiate the VMs on the infrastructure 114 as instructed in operation 410, if the service 130 is being scaled up, or de-allocate the VMs on the infrastructure 114 if the service 130 is being scaled down. It can be appreciated that if the images with embedded VSFs 124 are used, that operation 414 can include the infrastructure control 112 instantiating the VMs with embedded VSFs 124 on the infrastructure 114 (for scaling up operations), or de-allocating VMs with embedded VSFs 124 (for scaling down operations). It should be understood that these examples are illustrative and therefore should not be construed as being limiting in any way.

From operation 414, the method 400 proceeds to operation 416. At operation 416, the infrastructure control 112 can send instructions to the network control 118, and the network control 118 can receive the instructions from the infrastructure control 112. The instructions received and sent in operation 416 can correspond to instructions to establish transport between the VMs and/or VSFs 124 created in operation 414, as well as transport between the VMs and VSFs and the service control 122 created in operation 408. It can be appreciated that establishing transport can correspond to instances in which the service 130 is scaling up. If, however, the service 130 is being scaled down, operation 416 can correspond to the network control 118 receiving instructions to tear down or de-allocate transport functions or mechanisms between VMs, VSFs 124, and/or the service control 122. It should be understood that this example is illustrative and therefore should not be construed as being limiting in any way.

From operation 416, the method 400 proceeds to operation 418. At operation 418, the network control 118 can report the event to a network scope DCAE process. From operation 418, the method 400 proceeds to operation 420. At operation 420, the network control 118 can update the network level inventory to reflect the new resources created, or the resources de-allocated. As explained above, the network control 118 also can be configured to update the inventory 110, as shown at operation 420. It therefore should be understood that operation 420 can include the network control 118 updating the inventory 110, the inventory 110 updating itself, and/or the network control 118 updating a network level inventory. It should be understood that these examples are illustrative and therefore should not be construed as being limiting in any way.

From operation 420, the method 400 proceeds to operation 422. At operation 422, the service control 122 can report the event to a service scope DCAE process and update the service level inventory. As explained above, the service control 122 also can be configured to update the inventory 110, as shown at operation 424. It therefore should be understood that operations 424 can include the service control 122 updating the inventory 110, the inventory 110 updating itself, and/or the service control 122 updating a service level inventory. It should be understood that these examples are illustrative and therefore should not be construed as being limiting in any way.

From operation 424, the method 400 proceeds to operation 426. At operation 426, the service control 122 can establish and configure one or more VSFs 124 and/or NVSFs 128 on the infrastructure 114 if the service 130 is being scaled up, or de-allocate and/or tear down one or more VSFs 124 and/or NVSFs 128 if the service 130 is being scaled down. Thus, operation 426 can correspond to the service control 122 instantiating service functions on the resources or other infrastructure 114, or de-allocating the service functions. It should be understood that this example is illustrative and therefore should not be construed as being limiting in any way.

From operation 426, the method 400 proceeds to operation 428. At operation 428, the service control 122 can send instructions to the network control 118 and the network control 118 can receive the instructions from the service control 122. The instructions sent/received in operation 426 can correspond to instructions to establish transport between the VSFs 124 (for scaled up services 130) and/or to tear down or eliminate transport between the VSFs 124 for services 130 being scaled down. Although not separately illustrated in FIG. 4, the network control 118 can report the event to the network scope DCAE process and update the network level inventory. As explained above, the network control 118 also can be configured to update the inventory 110. It should be understood that these examples are illustrative and therefore should not be construed as being limiting in any way.

From operation 428, the method 400 proceeds to operation 430. At operation 430, the network control 118 can establish the transport requested in operation 428 or tear down or eliminate the transport identified in operation 428. Thus, in operation 430, the network control 118 can load one or more VNFs 120 and/or PNFs 126 to the infrastructure 114, de-allocate or unload one or more VNFs 120 and/or PNFs 126 from the infrastructure 114, combinations thereof, or the like.

Although not shown separately in FIG. 4, the service control 122 can perform end-to-end validation of the scaled service 130, in some embodiments. In some other embodiments, each of the infrastructure control 112, the network control 118, and/or the service control 122 can perform validation on functions or resources associated with those controllers. Also, though not separately shown in FIG. 4, the operations management controller 106 can update the inventory 110 in addition to, or instead of, each of the controllers updating an associated inventory. It should be understood that this example is illustrative and therefore should not be construed as being limiting in any way. The method 400 can end, in some embodiments, after operation 430.

According to some embodiments, the concepts and technologies described herein can support both virtualization (e.g. ETSI NFV) and SDN. Network functions can be virtualized in a way that is aligned with the ETSI NFV model. Networking (e.g., transport) can be provided through SDN in a way that can be aligned with the ONF model. The architecture can include ETSI NVF and ONF SDN, but can be broader. The architecture can support the use of COTS hardware, software-based (e.g. orchestration) deployment of new services 130 and scaling of existing services 130, and the use of SDN as a platform for service composition.

In some instances, as illustrated and described herein, the architecture can be divided into three scopes of control, namely infrastructure, networking, and service. These scopes can exist and can be managed independently from each other. Each scope can contain a set of control functions and controlled objects. Each control function can include one or more of a controller (e.g., the infrastructure control 112, the network control 118, and the service control 122), a DCAE process, orchestration functionality, and/or a policy decision function. The control functions may communicate with other control functions. A master control function (e.g., the operations management controller 106) can span all three scopes. It should be understood that this example is illustrative and therefore should not be construed as being limiting in any way.

The architecture can define two layers of orchestration, and can support the concepts of embedded feedback loops used for management and control and layered inventory management. According to various embodiments, services 130 can include at least one service control function (e.g., the service control 122) and corresponding service functions (e.g., the VSFs 124); one network control function (e.g., the network control 118) and corresponding networking functions (e.g., the VNFs 120 and PNFs 126); and one infrastructure control function (e.g., the infrastructure control 112) and corresponding infrastructure 114. The architecture can support the creation and definition of new services 130, which may be created by chaining existing services together in new ways such as chaining VNFs 120, PNFs 126, VSFs 124, and NVSFs 128, and their respective control functions together. Services implemented using the architecture may use a hierarchy of service control functions, network control functions, and/or infrastructure control functions. The services also may be implemented using SDN (e.g., deep packet inspection "DPI"). Thus, various embodiments of the concepts and technologies described herein can provide a service architecture that leverages virtualization and SDN concepts; supports dynamic scaling; removes the coupling between functions and hardware; supports COTS hardware; support software-based service deployment; maintains a separation between higher layer services, transport, and the underlying hardware resources; provides layers of management, control, and orchestration; and supports the creation of new service concepts using both virtualization and software defined networking.

While the above methods 200, 300, 400 illustrated in FIGS. 2-4 have provided specific examples of methods for creating, scaling, and/or managing services 130, a generalized scaling flow can be expressed for the architecture. In particular, a common, high level process can be used to deploy new services 130, scale existing services 130, configure services 130, deploy new transport functions, and scale existing transport functions. An example embodiment of the generalized flow is expressed below. It should be understood that this example is illustrative and therefore should not be construed as being limiting in any way.

In a first operation, detection of scaling event and initiation of responsive action can be performed. In a second operation, allocation of infrastructure resources by the infrastructure control 112 can be performed. In a third operation, creation of transport between the infrastructure resources and a service control 122 or network control 118 can be performed. In a fourth operation, instantiation of VFs by the control function (e.g., VNFs 120 and VSFs 124) can be performed. In a fifth operation, creation of transport between the newly created VFs can be performed. In a sixth operation, validation of the service 130 can be performed. In a seventh operation, the inventory 110 can be updated (and/or scope-level inventories can be updated). It should be understood that this example is illustrative and therefore should not be construed as being limiting in any way.

Furthermore, while the above methods 200, 300, 400 have been described with respect to embodiments for instantiating and/or scaling services 130, the concepts and technologies described herein also can support scaling of network components and/or instantiation of network components. According to various embodiments, a process for instantiating a network component can be substantially similar to the methods 200, 400 and a process for scaling a network component can be substantially similar to the method 300.

The control system 102 illustrated and described herein can provide multiple functions. The operations management controller 106, infrastructure control 112, network control 118, and service control 122 can each contain control and management functions operating within their respective scopes. These functions can be policy based and can include policies for event and exception handling, analytics, elastic capacity management, and/or other functions.

With regard to event and exception handling, the control system 102 can handle faults, events, exceptions, or the like, which can be generated by the infrastructure 114 and/or the VNFs 120 or VSFs 124 operating within the infrastructure 114. In some embodiments, the control system 102 can use policy to handle the faults and, based on the policy, take an action, escalate the fault to a higher level, or do nothing. In the case of taking an action, the control system 102 can be configured to restart a function, component, or control; move a function, component, or control; configure or reconfigure a function, component, or control; scale a function, component, or control; instruct controls to modify or scale other resources to address the fault; combinations thereof; or the like. It should be understood that these examples are illustrative and therefore should not be construed as being limiting in any way.

Figure 5:
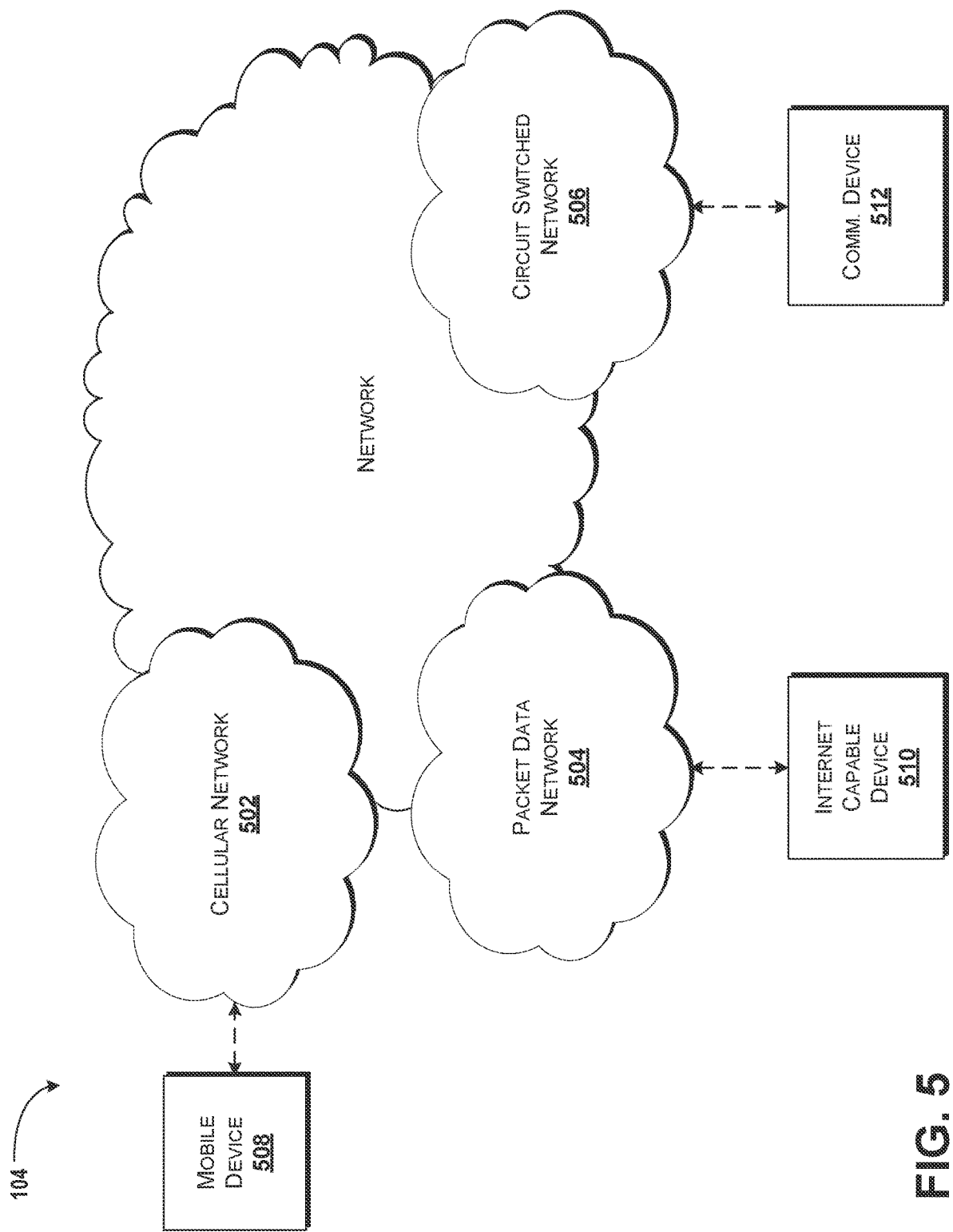
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("STSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSS s"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
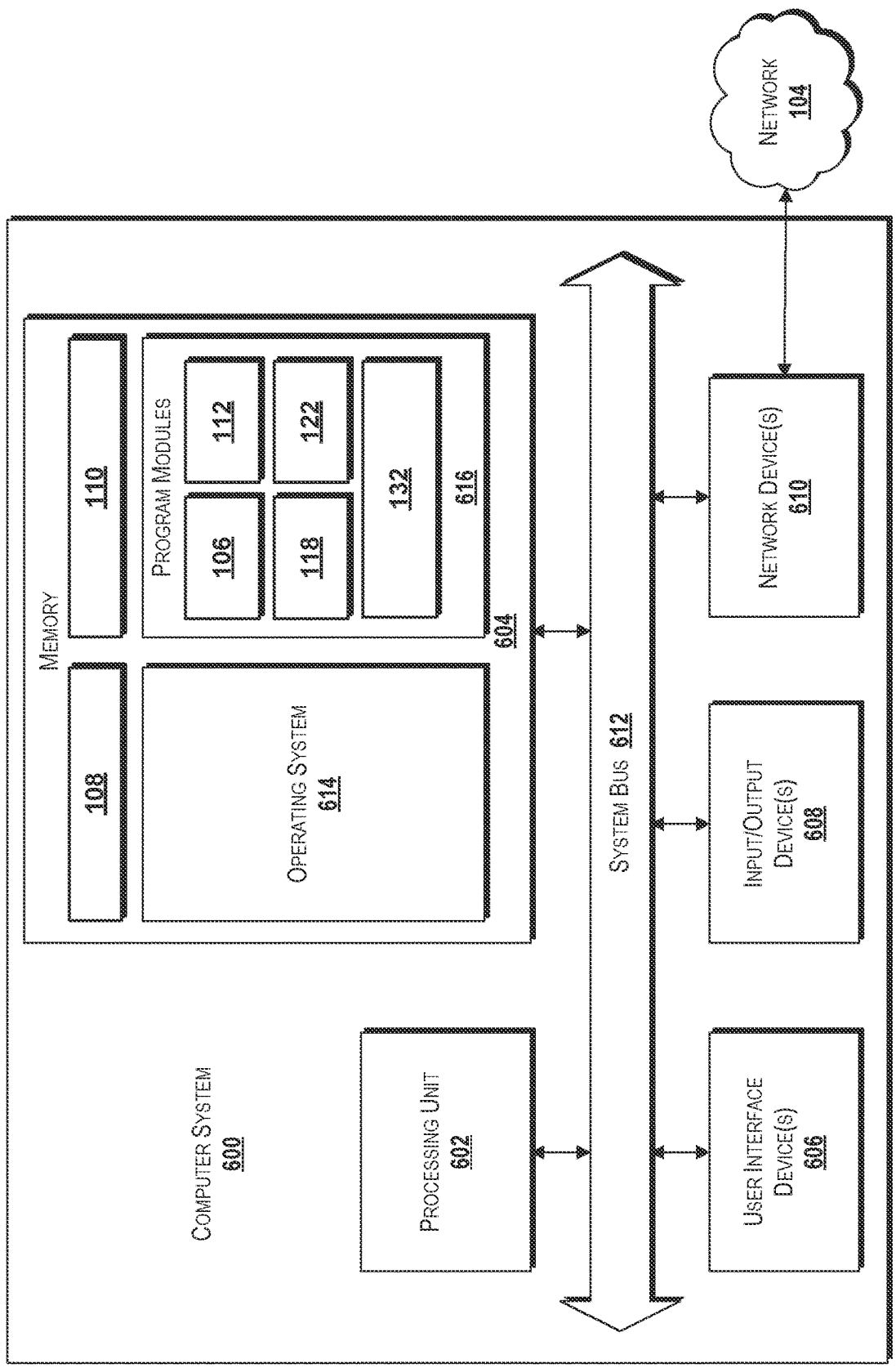
FIG. 6 is a block diagram illustrating an example computer system configured to provide the functionality illustrated and described herein for service creation and management, according to some illustrative embodiments of the concepts and technologies described herein.

FIG. 6 is a block diagram illustrating a computer system 600 configured to provide the functionality described herein for service creation and management, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include one or more of the operations management controller 106, the infrastructure control 112, the network control 118, the service control 122, the ECOMP 132, or the like. These and/or other programs can be embodied in computer-readable media containing instructions that, when executed by the processing unit 602, perform one or more of the methods 200, 300, 400 described in detail above with respect to FIGS. 2-4. According to embodiments, the program modules 616 may be embodied in hardware, software, firmware, or any combination thereof. Although not shown in FIG. 6, it should be understood that the memory 604 also can be configured to store the VNFs 120, the VSFs 124, the service 130, the service creation database 108, the inventory 110, the various DCAE modules associated with the various components of the control system 102, the polices, the scope-specific inventories, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for service creation and management have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
one or more processors; and
one or more memories configured for storing computer-executable instructions that, when executed by the one or more processors, cause the one or more processors to perform operations comprising:
obtaining a recipe including a set of service components for a service to be used to provide functionality associated with the service;
identifying a service control that is to operate the service;
instructing an infrastructure control to instantiate a virtual machine, the virtual machine selected in accordance with at least a portion of the set of service components;
causing the service control to load one or more of the set of service components onto the virtual machine; and
causing the virtual machine to execute the one or more of the set of service components of the service to provide the functionality associated with the service.

2. The system of claim 1, wherein:
in response to determining that the virtual machine and at least one of the set of service components are not needed to support the service, the operations further comprise instructing the infrastructure control to de-allocate the virtual machine and the at least one of the set of service components; and
de-allocating the virtual machine comprises de-allocating the at least one of the set of service components that is loaded to the virtual machine.

3. The system of claim 1, wherein:
the operations further comprise detecting a capacity change associated with the service; and
in response to detecting the capacity change, further instructions are issued to the infrastructure control to instantiate another virtual machine or increase a capacity of the virtual machine.

4. The system of claim 3, wherein the capacity change comprises a request to scale down the service.

5. The system of claim 3, wherein the capacity change comprises a request to reallocate components of the service.

6. The system of claim 1, wherein instantiating the virtual machine comprises loading, to the virtual machine, an image of a virtual service function corresponding to the one or more of the set of service components.

7. The system of claim 1, wherein:
the functionality associated with the service includes providing functionality to a mobile device; and
the mobile device is operably coupled to the virtual machine by a cellular network.

8. A computer-implemented method comprising:
obtaining a set of service components for a service to be used to provide functionality associated with the service;
identifying a service control that is to operate the service;
instructing an infrastructure control to instantiate a virtual machine, the virtual machine selected in accordance with at least a portion of the set of service components;
causing the service control to load one or more of the set of service components onto the virtual machine; and
causing the virtual machine to execute the one or more of the set of service components of the service to provide the functionality associated with the service.

9. The computer-implemented method of claim 8, wherein:
the method further comprises detecting a capacity change associated with the service; and
in response to detecting the capacity change, further instructions are issued to the infrastructure control to instantiate an additional virtual machine or increase a capacity of the virtual machine.

10. The computer-implemented method of claim 8, wherein instantiating the virtual machine comprises loading, to the virtual machine, an image of a virtual service function corresponding to the one or more of the set of service components.

11. The computer-implemented method of claim 8, wherein:
in response to determining that the virtual machine and at least one of the set of service components are not needed to support the service, the method further comprises instructing the infrastructure control to de-allocate the virtual machine and the at least one of the set of service components; and
de-allocating the virtual machine comprises de-allocating the at least one of the set of service components that is loaded to the virtual machine.

12. The computer-implemented method of claim 9, wherein the capacity change comprises a request to scale down the service.

13. The computer-implemented method of claim 9, wherein the capacity change comprises a request to reallocate components of the service.

14. The computer-implemented method of claim 8, wherein:
the functionality associated with the service includes providing functionality to a mobile device; and
the mobile device is operably coupled to the virtual machine by a cellular network.

15. The computer-implemented method of claim 8, wherein the functionality associated with the service includes providing functionality to a device via a web browser.

16. A computer storage medium having computer-executable instructions stored thereon that, when executed by a processor, cause the processor to perform operations comprising:
obtaining a set of service components for a service to be used to provide functionality associated with the service;
instructing an infrastructure control to instantiate a virtual machine, the virtual machine selected in accordance with at least a portion of the set of service components;
causing a service control to load one or more of the set of service components onto the virtual machine; and
causing the virtual machine to execute the one or more of the set of service components of the service to provide the functionality associated with the service.

17. The computer storage medium of claim 16, wherein:
in response to determining that the virtual machine and at least one of the set of service components are not needed to support the service, the operations further comprise instructing the infrastructure control to de-allocate the virtual machine and the at least one of the set of service components.

18. The computer storage medium of claim 16, wherein:
the operations further comprise detecting a capacity change associated with the service; and
in response to detecting the capacity change, further instructions are issued to the infrastructure control to instantiate an additional virtual machine or increase a capacity of the virtual machine.

19. The computer storage medium of claim 18, wherein the capacity change comprises a request to scale down the service.

20. The computer storage medium of claim 18, wherein the capacity change comprises a request to reallocate components of the service.

* * * * *